US006191788B1

(12) United States Patent
Fuller

(10) Patent No.: US 6,191,788 B1
(45) Date of Patent: Feb. 20, 2001

(54) METHOD AND APPARATUS FOR APPROXIMATING NONLINEAR FUNCTIONS IN A GRAPHICS SYSTEM

(75) Inventor: Richard J. Fuller, Lexington, MA (US)

(73) Assignee: ATI International SRL, Hasting (BB)

( * ) Notice: Under 35 U.S.C. 154(b), the term of this patent shall be extended for 0 days.

(21) Appl. No.: 09/213,195

(22) Filed: Dec. 17, 1998

(51) Int. Cl.[7] .................................................. G06F 15/00
(52) U.S. Cl. ............................................................ 345/419
(58) Field of Search .................................... 345/418, 419, 345/425, 440, 441, 118, 121

(56) References Cited

U.S. PATENT DOCUMENTS 5,949,424 * 9/1999 Cabral et al. ........................ 345/426

* cited by examiner

Primary Examiner—Phu K Nguyen

(74) Attorney, Agent, or Firm—Markison & Reckamp, P.C.

(57) ABSTRACT

A method and apparatus for approximating exponential and other nonlinear functions in a graphics system is accomplished using a linear interpolator adapted to receive a graphics primitive that includes vertex values for a parameter at each vertex of the graphics primitive. The linear interpolator determines a linear interpolation value for the parameter at a selected pixel within the primitive based on the vertex values. The linear interpolation value is then used to generate a first index and a fractional value, where the fractional value is the difference between the linear interpolation value and the first index. The first index is then incremented to produce a second index. The first and second indexes are then applied to a memory block that stores a discrete sampling of a nonlinear function corresponding to the parameter. The first index and the second index correspond to sample points of the nonlinear function, and the memory block provides a first sample and a second sample of the nonlinear function in response to the first and second indexes. An arithmetic unit then combines the first and second samples using the fractional value to determine a value for the parameter at the selected pixel.

23 Claims, 5 Drawing Sheets

| Index | Parameter Value |
|---|---|
| $I_{odd}1$ | $P_{odd}1$ |
| $I_{odd}2$ | $P_{odd}2$ |
| $I_{odd}3$ | $P_{odd}3$ |
| $I_{odd}4$ | $P_{odd}4$ |
| $I_{odd}5$ | $P_{odd}5$ |

Odd Memory Block
150

| Index | Parameter Value |
|---|---|
| $I_{even}1$ | $P_{even}1$ |
| $I_{even}2$ | $P_{even}2$ |
| $I_{even}3$ | $P_{even}3$ |
| $I_{even}4$ | $P_{even}4$ |
| $I_{even}5$ | $P_{even}5$ |

Even Memory Block
160

METHOD AND APPARATUS FOR APPROXIMATING NONLINEAR FUNCTIONS IN A GRAPHICS SYSTEM

FIELD OF THE INVENTION

The invention relates generally to graphics processing and more particularly to a method and apparatus for approximately nonlinear functions in a graphics system.

BACKGROUND OF THE INVENTION

Computers are used in many applications. As computing systems continue to evolve, the graphical display characteristics of these computing systems become more and more advanced. As more advanced graphical display systems are created, the visual effects that these systems are able to achieve are increasingly complex. In many cases the graphical displays attempt to approximate real-world visual effects. This can be problematic, as some real-world phenomena do not map easily to a digital processing system.

One example is an attempt to achieve nonlinear functions in a graphical display. An example of such a nonlinear function is the attempt to simulate fogging effects on a graphical display. In order to simulate a fogging effect, images that are drawn with the intent to appear closer to the viewer are clearer than those in the distance. Fog is typically simulated through an exponential function that causes images to be increasingly blurred or "grayed-out" exponentially as they fade into the distance. Thus, the weight of the fog or the amount of contribution that the fog provides for images that are close to the viewer is small, whereas the weight increases exponentially as the fade into the distance.

Triangles or other primitives are often used in graphics systems to generate images. Typically, these graphics primitives only include a limited set of values for the different parameters that describe the primitive. In most cases, the limited set of values corresponds to the vertices of the primitive. Therefore, a triangle primitive will contain three sets of values, one at each vertex of the triangle. The values at each vertex will represent a value for a particular parameter at that vertex. In order to determine the value of a parameter at a point between the vertices, a linear interpolation is typically performed based on the values at each of the vertexes. Because this interpolation is performed in a linear fashion, it is very difficult to simulate exponential or other nonlinear functions, such as those required to accurately simulate a fogging effect.

The problems associated with attempting to simulate exponential and other nonlinear functions using the linear interpolation performed within graphics primitives becomes increasingly problematic in large primitives. This is because the variation or gradient of the particular parameter may be substantial across such a large primitive. In such cases, the linear approximation produced through linear interpolation may significantly diverge from the ideal nonlinear function.

A potential solution to the problem of approximating nonlinear functions within a graphics primitive is to perform a nonlinear calculation based on the nonlinear function each time a value is required. However, this solution is impractical, as the time required to perform the many complex nonlinear calculations would have a detrimental effect on the performance of the overall graphics system.

Therefore, a need exists for a method and apparatus that allow exponential and other nonlinear functions to be accurately and efficiently approximated in a graphics system.

DETAILED DESCRIPTION OF A PREFERRED EMBODIMENT OF THE INVENTION

Generally the present invention provides a method and apparatus for approximating exponential and other nonlinear functions in a graphics system. This is accomplished by a linear interpolator adapted to receive a graphics primitive that includes vertex values for a parameter at each vertex of the graphics primitive. The linear interpolator determines a linear interpolation value for the parameter at a selected pixel within the primitive based on the vertex values. The linear interpolation value is then used to generate a first index and a fractional value, where the fractional value is the difference between the linear interpolation value and the first index. The first index is then incremented to produce a second index. The first and second indexes are then applied to a memory block that stores a nonlinear function corresponding to the parameter. The first index and the second index correspond to sample points of the nonlinear function, and the memory block provides a first sample and a second sample of the nonlinear function in response to the first and second indexes. An arithmetic unit then combines the first and second samples using the fractional value to determine a value for the parameter at the selected pixel. Preferably, this is accomplished by performing a linear interpolation between the first and second samples based on the fractional value.

By storing a sampled version of the nonlinear function in memory and using linear interpolated values to reference the nonlinear function, a close approximation to the nonlinear function can be achieved in the processing of graphics primitives. This approximation of a nonlinear function allows nonlinear effects to be approximated in the graphic system in an efficient manner that avoids complex, multi-step calculations that would be required if the nonlinear function values were computed each time a parameter value is needed.

Figure 1:
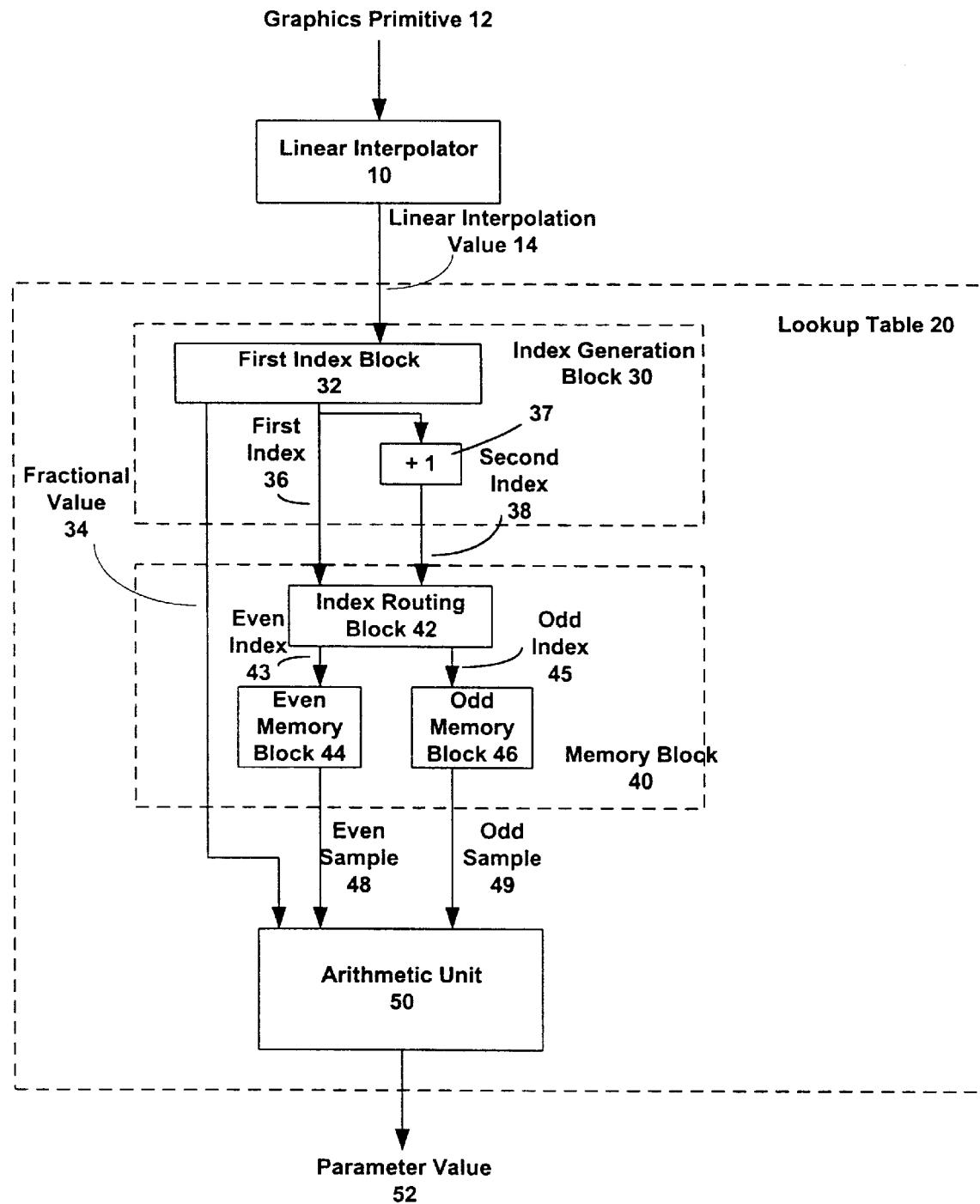
FIG. 1 illustrates a block diagram of a graphics processing circuit in accordance with the present invention.

The invention can be better understood with reference to FIGS. 1–6. FIG. 1 illustrates a graphics processing circuit that includes a linear interpolator 10 and a lookup table 20. The linear interpolator 10 is adapted to receive a graphics primitive 12, where the graphics primitive 12 includes vertex values for a parameter at each vertex of the graphics primitive. Thus, in an example embodiment where a fogging effect is approximated, the graphics primitive 12 includes a value for the fog parameter at each of the vertexes of the primitive 12. If the graphics 12 is a triangle, which is common in many graphics systems, three fog parameter values corresponding to the three triangle vertices will be included with the graphics primitive 12.

The linear interpolator 10 determines a linear interpolation value 14 for the parameter at a selected pixel within the primitive based on the vertex values. If the primitive is a triangle, and the selected point, or pixel within the graphics primitive is located equidistant from all three of the vertices, the values for the fog parameter at each of the vertices will be averaged to determine a linear interpolation value 14 for the parameter at that pixel location. The linear interpolation value 14 is preferably a weighted average of the values of the parameter at each of the vertices, where the weighting of the contribution of each vertex is based on its proximity to the selected pixel within the primitive.

The lookup table 20 includes an index generation block 30, a memory block 40, and an arithmetic unit 50. The index generation block 30 receives the linear interpolation value 14 from the linear interpolator 10 and generates a first index 36, a second index 38, and a fractional value 34 based on the linear interpolation value 14. The fractional value 34 is based on a difference between the linear interpolation value 14 and at least one of the first index 36 and the second index 38. Preferably, the fractional value 34 is equal to the difference between the first index 36 and the linear interpolation value 14. Preferably, the first index 36 is the closest, yet smaller, index in relation to the linear interpolation value 14. In such a case, the fractional value 34 is the difference between the first index 36 and the linear interpolation value 14, and the second index 38 is the closest index to the linear interpolation value 14 that is greater than the linear interpolation value 14. In such an arrangement, an efficient way of calculating the second index 38 is to increment the first index 36 using an incrementing block 37 to produce the second index 38.

The memory block 40 stores a discrete sampling of a nonlinear function that corresponds to the parameter for which a value is being determined. The first and second indexes 36 and 38 correspond to sample points of the nonlinear function. When the first index 36 is applied to the memory block 40, a first sample of the nonlinear function is returned in response. Similarly, when the second index 38 is provided to the memory block, a second sample of the nonlinear function is returned to in response.

In order to increase the efficiency of the circuitry that provides the samples of the nonlinear function in response to the indexes, the memory block 40 is preferably divided into an index routing block 42, and even memory block 44, and an odd memory block 46. The index routing block 42 is operably coupled to the index generation block 30 and determines which of the first and second indexes 36 and 38 is the even index 43 and which is the odd index 45. Because the second index 38 and the first index 36 are neighboring or sequential indexes within the sample space, it is apparent that one of the two indexes is odd, while the other is even. The index routing block 42 determines which is even and which is odd and routes the even index 43 to the even memory block 44, and the odd index 45 to the odd memory block 46.

The even memory block 44 stores samples of the nonlinear function corresponding to even index values, and the odd memory block 46 stores samples of the nonlinear function corresponding to odd index values. The construction of these two memory blocks can be better understood with reference to FIGS. 2 and 3.

Figures 2, 3:
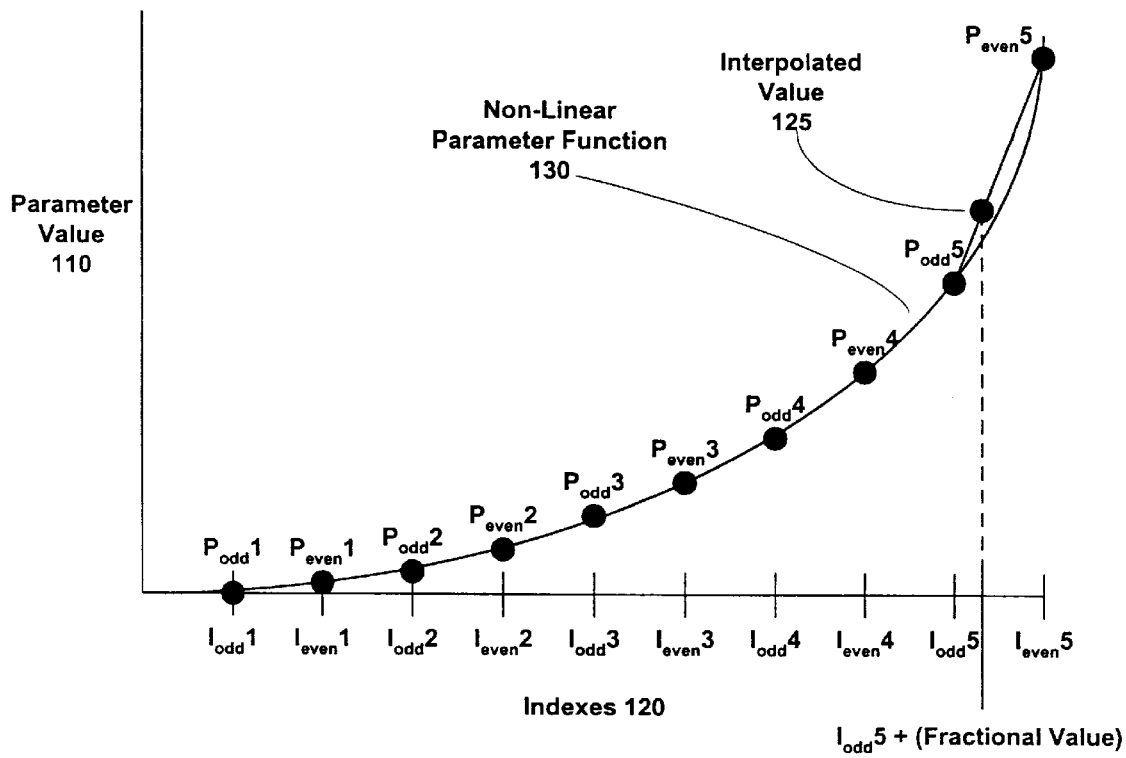
FIG. 2 illustrates a graph of a nonlinear parameter function that has been sampled in accordance with the present invention.
FIG. 3 illustrates a block diagram of even and odd parameter memory blocks in accordance with the present invention.

FIG. 2 illustrates a nonlinear parameter function 130 that has been sampled to produce a number of sample points. The sample points shown are labeled $P_{odd}1$–$P_{odd}5$ and $P_{even}1$–$P_{even}5$. The graph illustrated plots the parameter value 110 versus the linear interpolation value represented by indexes 120. The indexes 120 are labeled $I_{odd}1$–$I_{odd}5$ and $I_{even}1$–$I_{even}5$. For each of the indexes 120 there is a corresponding parameter value sample that lies on the line representing the nonlinear parameter function 130. The nonlinear parameter function 130 shown is exponential, but it should be apparent to one of ordinary skill in the art that any other nonlinear function may be used.

FIG. 3 illustrates odd memory block 150 and even memory block 160. These memory blocks 150 and 160 are structured in a similar manner to the even memory block 44 and the odd memory block 46 of FIG. 1. The odd memory block 150 stores all of the odd indexes, $I_{odd}1$–$I_{odd}5$, and the corresponding parameter values for those indexes, $P_{odd}1$–$P_{odd}5$. Similarly, the even memory block 160 stores the even indexes, $I_{even}1$–$I_{even}5$, and the corresponding parameter values for the even indexes, $P_{even}1$–$P_{even}5$.

Returning to the system illustrated in FIG. 1, it should be apparent that the lookup of nonlinear samples in the even memory block 44 and the odd memory block 46 can occur in parallel, rather than sequentially applying the indexes to a single memory block. The application of the even index 43 and the odd index 45 to the even memory block 44 and the odd memory block 46 produces an even sample 48 and an odd sample 49, where the samples 48 and 49 correspond to the value of the nonlinear function at the points corresponding to the indexes 43 and 45.

The arithmetic unit 50, which is operably coupled to the memory block 40 and the index generation block 30, generates a value for the parameter at the selected pixel based on the even sample 48, the odd sample 49, and the fractional value 34. Preferably, the arithmetic unit 50 generates this value by performing a linear interpolation between the first sample and the second sample. It should be noted that the first sample may correspond either the even sample 48, or the odd sample 49, depending on which of the even index 43 or the odd index 45 was the first index 36. The linear interpolation performed by the arithmetic unit 50 is preferably equivalent to a weighted average, where the weighting attributed to the even sample 48 and the odd sample 49 is determined based on the fractional value 34. The product of the arithmetic unit 50, which is the parameter value 52, which is the value of the parameter at the selected location within the graphics primitive 12.

By referring to FIG. 2, the preferable method for generating the parameter value 52 by the arithmetic unit 50 can be better understood. FIG. 2 illustrates a specific linear interpolation value for the function illustrated as $I_{odd}5$+ (fractional value). As can be seen, the position of this value along the index axis is located between the indexes $I_{odd}5$ and $I_{even}5$. Therefore the index generation block 30 of FIG. 1 would return as a first index the $I_{odd}5$ index, and the fractional value would be the difference between the point on the index axis and the $I_{odd}5$ index. By incrementing the $I_{odd}5$ index, the second index would be generated. As can be seen from the figure, this would be the $I_{even}5$ index.

Once it is determined that the $I_{odd}5$ index is the odd index, applying the $I_{odd}5$ index to the odd index lookup table 150 returns the $P_{odd}5$ parameter value, which as is shown in FIG. 2, is a point on the nonlinear parameter function curve 130. Similarly, applying the $I_{even}5$ index to the even index lookup table 160 will return the $P_{even}5$ parameter value, which corresponds to another point on the nonlinear parameter function curve 130.

The actual value generated by the arithmetic unit 50 is based on these two returned parameter values, $P_{odd}5$ and $P_{even}5$, and the fractional value that was determined earlier. FIG. 2 shows a line drawn between the $P_{odd}5$ parameter value and the $P_{even}5$ parameter value. By moving along this line a distance that project a value on the index axis equivalent to the fractional value, an interpolated value 125 will be achieved. Note that the interpolated value 125 does not lie on the actual nonlinear parameter function curve 130, but is in fact a fairly close approximation to the curve.

In order to achieve this linear interpolation value, the arithmetic unit 50 adds the $P_{odd}5$ parameter multiplied by the fractional value with the $P_{even}5$ parameter value multiplied by one minus the fractional value, and then dividing this sum by 2 to achieve the interpolated value 125. The equation for this calculation is ($P_{odd}5$*fractional value)+ ($P_{even}5$*(1−fractional value)). Note that this calculation is based on the fact that the odd parameter value corresponds to the lesser index. The multipliers in the equation would be reversed with respect to the even and odd indexes if the even index were the lesser index.

Thus, by taking a linear interpolation value and determining the two closest indexes to a nonlinear parameter curve, two approximate values for a parameter are returned. These two values are then weighted based on the distance the actual linear interpolation value lies between the two indexes to determine a parameter value that approximates an actual point on the curve corresponding to the linear interpolation value. The accuracy of the approximation based on the rate at which the nonlinear parameter function is sampled and stored within the memory block, as more samples will allow the indexes to produce approximate parameter values that are closer approximations to the actual value of the function.

Nonlinear functions that may be stored in the memory block 40 can include parameters such as the fogging type effect parameter; an alpha blend parameter, where the alpha blend parameter corresponds to a level of translucence or transparency on the part of a graphics element; a Z value, where the Z value determines a three-dimensional depth parameter for the particular primitive or portion of the primitive; a color value, where the color within a specific primitive can vary greatly across the primitive; and a specular parameter, where a specular parameter helps achieve different lighting effects within the primitive. These parameters are merely an illustrative list of parameters that could be included in such a system, and should not be viewed as an exhaustive recitation of potential parameters.

The nonlinear functions that may be stored for these parameters within the memory block can include functions such as exponential functions, a staircase type function that steps up gradually or steps down gradually, or any other type of function that might be desirable in a graphics application.

Figure 4:
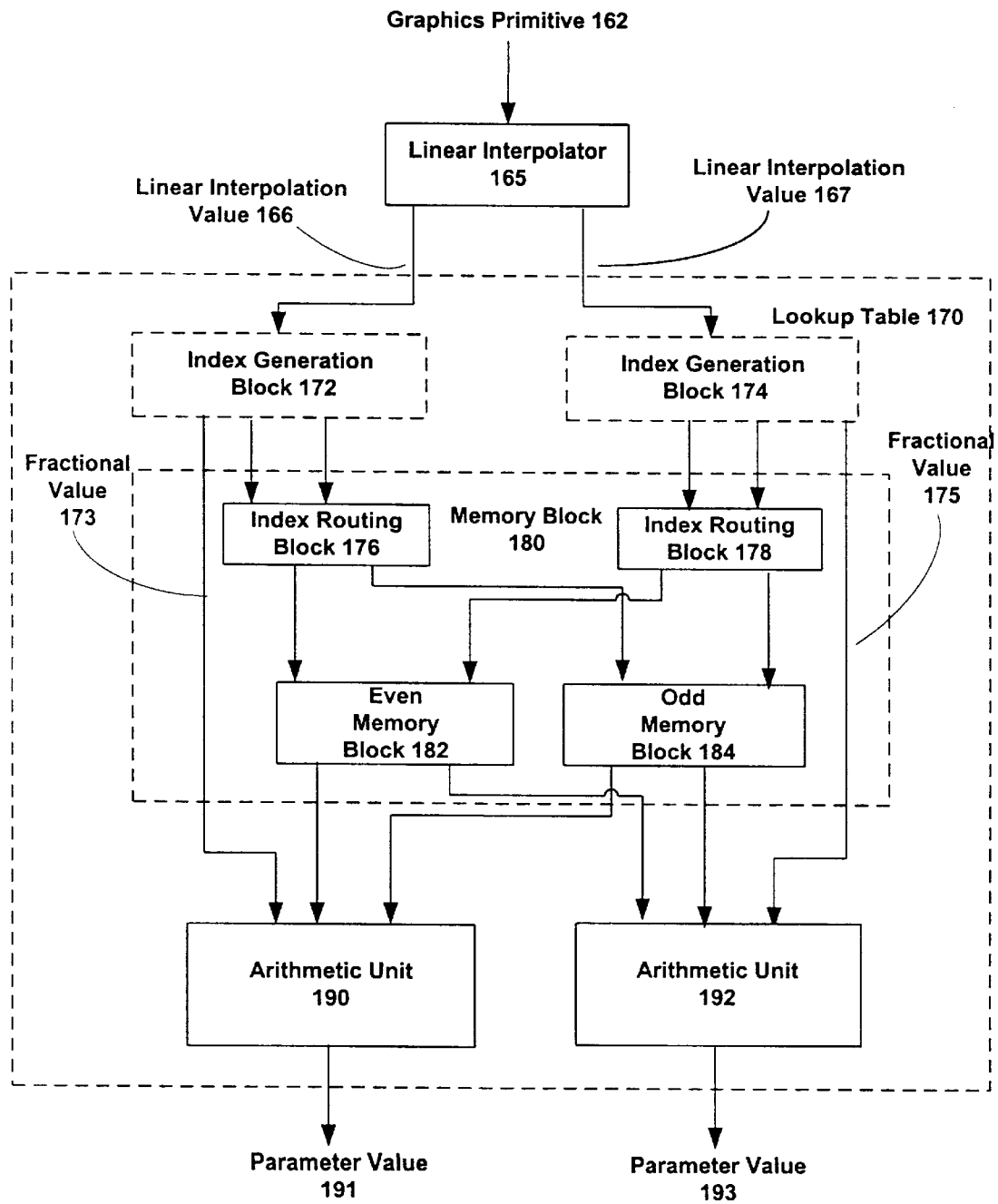
FIG. 4 illustrates a block diagram of an alternate graphics processing circuit in accordance with the present invention.

FIG. 4 illustrates an alternate graphics processing circuit that is capable of performing two non-linear approximations using a single set of even and odd memory blocks 182 and 184. The circuit includes a linear interpolator 165 that receives a graphics primitive 162 and generates two linear interpolation values 166 and 167 based on the vertex values included with the graphics primitive. This is similar to the function performed by the linear interpolator 10 of FIG. 1, but two interpolation values are generated.

The first linear interpolation value 166 is routed to a first index generation block 172 of a lookup table 170. The first index generation block generates a first index, a second index, and a first fractional value 173 based on the first linear interpolation value 166. The first and second indexes are received by a first index routing block 176 of the memory block 180 that determines which of the first and second indexes are even and odd, and routes the indexes to the even memory block 182 and the odd memory block 184 accordingly.

In a similar manner, the second linear interpolation value 167 is routed to a second index generation block 174 of the lookup table 170. The second index generation block generates a third index, a fourth index, and a second fractional value 173 based on the second linear interpolation value 167. The third and fourth indexes are received by a second index routing block 178 of the memory block 180 that determines which of the third and fourth indexes are even and odd, and routes the indexes to the even memory block 182 and the odd memory block 184 accordingly.

The even and odd memory blocks 182 and 184 return four sample values in response to the four indexes. The samples corresponding to the first and second indexes are used by the first arithmetic unit 190 to produce a first parameter value 191. The arithmetic unit 190 performs this function utilizing the first fractional value 173 in the same manner as was described with respect to the arithmetic unit 50 of FIG. 1. The samples corresponding to the second and third indexes are used by the second arithmetic unit 192 to produce a second parameter value 193. The arithmetic unit 192 performs this function utilizing the second fractional value 175 in the same manner as was described with respect to the arithmetic unit 50 of FIG. 1.

By providing the even and odd memory blocks 182 and 184 with a second read port, the memory blocks 182 and 184 can return the samples corresponding to the four indexes in parallel. This allows the non-linear parameter values for two pixel locations to be generated in parallel using a single set of memory blocks. This improves the efficiency of the system by increasing processing capabilities without increasing the memory requirements.

Figure 5:
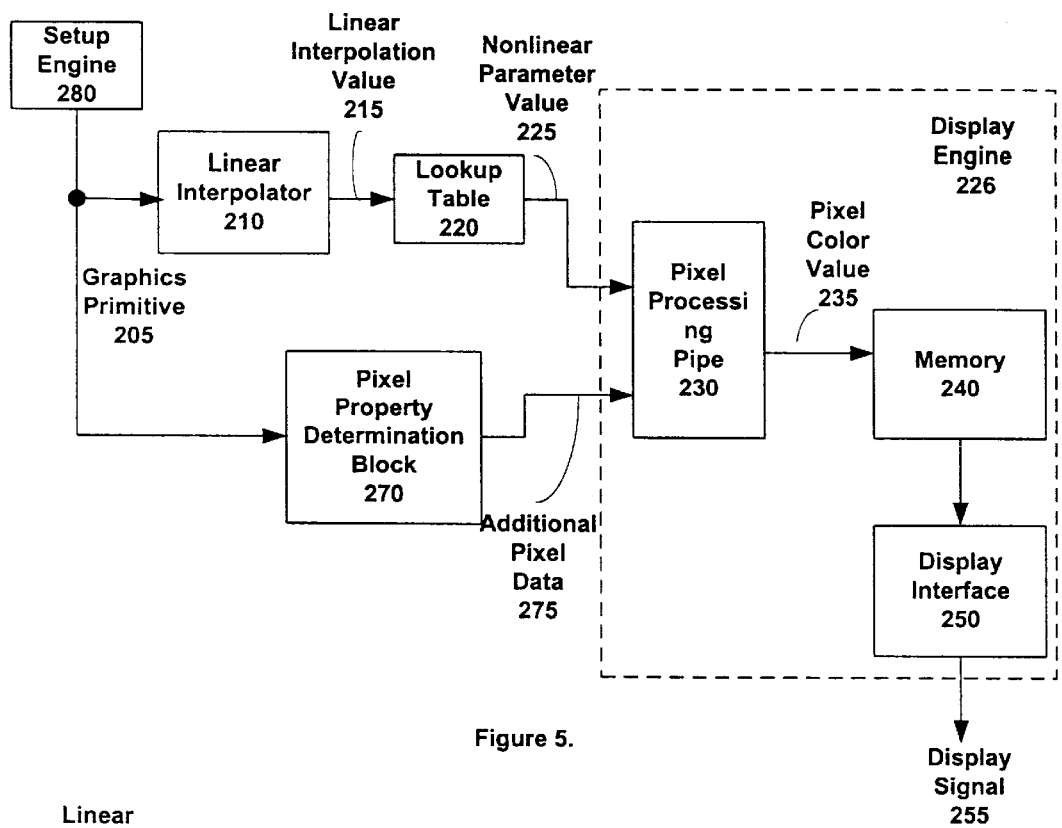
FIG. 5 illustrates a block diagram of another alternate graphics processing circuit in accordance with the present invention.

FIG. 5 illustrates a graphics processing circuit that includes a linear interpolator 210, a lookup table 220, and a display engine 226. As before, the linear interpolator 210 receives a graphics primitive 205, where the graphics primitive 205 includes vertex values for a parameter at each vertex of the graphics primitive. Preferably, the graphics primitive 205 is generated by a setup engine 280 that generates graphics primitives for display.

The linear interpolator 210 receives the graphics primitive 205 and generates a linear interpolation value 215 for the parameter at a point within the primitive 205 based on the vertex values. Preferably, the graphics primitive 205 is a triangle primitive, which is common in most graphics systems today. In such an embodiment, the graphics primitive 205 will include three values for each parameter within the primitive.

Figure 6:
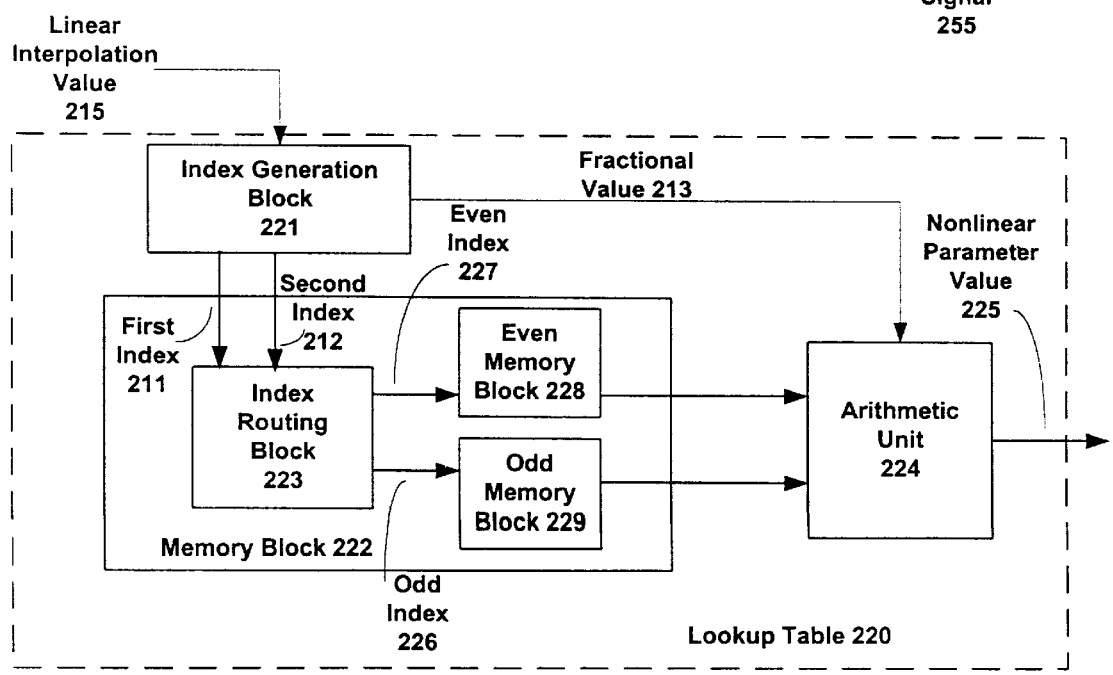
FIG. 6 illustrates a block diagram of a detailed view of a lookup table in accordance with the present invention.

The lookup table 220 is operably coupled to the linear interpolator 210 and receives the linear interpolation value 215. In response to the linear interpolation value 215, the lookup table 220 provides a nonlinear parameter value 225. The lookup table 220 may simply be a memory structure that stores discrete samples of a nonlinear function, where the lookup table 220 is indexed by the linear interpolation value 215. The preferable functionality and structure of the lookup table 220 can be better understood by referencing FIG. 6, which illustrates an embodiment of the lookup table 220 in more detail. FIG. 6 shows the lookup table 220 to include an index generation block 221, a memory block 222, and an arithmetic unit 224. Each of these blocks performs a similar function as the corresponding blocks illustrated in FIG. 1. The index generation block 221 receives the linear interpolation value 215 and generates a first index 211, a second index 212, and a fractional value 213 using the linear interpolation value 215. Preferably, the index generation block 221 generates these values in the same manner as described with respect to the index generation block 30 of FIG. 1.

The memory block 222 receives the first index 211 and the second index 212 from the index generation block 221 and provides a first nonlinear lookup value in response to the first index 211 in a second nonlinear lookup value in response to the second index 212. Preferably this is accomplished using the index routing block 223 and even and odd memory blocks 228 and 229. The index routing block 223 determines which of the first index 211 and the second index 212 is the even index 227, and which is the odd index 226. The even index 227 is provided to the even memory block 228 which responds with an even nonlinear lookup value, as the even memory block 228 stores nonlinear lookup values corresponding to even index values. Similarly, the odd memory block 229 returns an odd nonlinear lookup value in response to the odd index 226, as the odd memory block 229 stores nonlinear lookup values corresponding to odd index values.

The arithmetic unit 224 receives the resulting nonlinear lookup values from the memory block 222, and the arithmetic unit 224 generates the nonlinear parameter value 225 based on the first nonlinear lookup value, second nonlinear lookup value, and the fractional value 213. Preferably, the arithmetic unit 224 determines the nonlinear parameter value 225 by performing a linear interpolation between the first nonlinear lookup value and the second nonlinear lookup value using the fractional value 213. This process is performed as described with respect to FIG. 2 above.

Returning to FIG. 5, the nonlinear parameter value 225 produced by the lookup table 220 is provided to the display engine 226. The display engine 226 combines the nonlinear parameter value 225 with additional pixel data 275 to produce a display signal 255. Preferably, the lookup table 220 stores a nonlinear function such as an exponential parameter curve, which is used to create effects in the display signal 255. The list of potential effects that may be produced using this type of setup includes the nonlinear fogging effects described earlier, nonlinear alpha blending, nonlinear Z values, nonlinear color values, and nonlinear specular values. As before, this list is merely illustrative of potential applications of the system illustrated, and it should be apparent to one of ordinary skill in the art that many more uses for the nonlinear lookup apparatus and method can be derived based on the needs of a particular application.

In some embodiments, one parameter of the graphics primitive may be used to determine a non-linear parameter value corresponding to another parameter. Thus, a Z value, or depth parameter, could be used to generate a linear interpolation value that is used to address a lookup table that stores a non-linear function corresponding to a fogging parameter. A system such would find application in a graphics display system that exponentially increases the amount of "fogging" applied to a pixel in a primitive based on the Z value of the pixel, or its distance from the point of perception. Similar examples might include graying of color values and decreased illumination effects from a light source based on depth.

A number of parameter calculation blocks that include a linear interpolator and a lookup table may be included in the system, where each block is capable of providing a nonlinear approximation to a particular parameter. These individual parameters can then be combined in the display engine 226 to determine the color value for each pixel of the display. Therefore, the additional pixel data 275 that is processed by the display engine 226 along with the nonlinear parameter value 225 to generate the display signal 255 may be generated by an additional nonlinear lookup table and linear interpolator. In other embodiments or specific iterations within the system, the additional pixel data 275 may be linear interpolations for a particular parameter based on the vertex values of the graphics primitive. For illustrative purposes, each of these potential sources of additional pixel data 275 is grouped with other sources in the pixel property determination block 270. The display engine 226 combines the additional pixel data 275 with the nonlinear parameter value 225 to produce the display signal 255.

The display engine 226 preferably includes a pixel processing pipe 230, a memory 240, and a display interface 250. The pixel processing pipe 230 combines the nonlinear parameter value 225 with at least a portion of the additional pixel data 275 to produce a pixel color value 235. The portion of the additional pixel data 275 with which the pixel processing pipe 230 combines the nonlinear parameter value 225 is pixel data that corresponds to the same pixel for which the nonlinear interpolation was performed by the linear interpolator 210 and the lookup table 220. Combining the different elements for the particular pixel generates the pixel color value 235.

The pixel color value 235 is stored in the memory 240 for reference by the display interface 250. The display interface 250 retrieves pixel color values from the memory and includes those pixel color values in the display signal 255. The display interface reads each of the color values for different pixels in the display from the memory 240 and generates the display signal 255 such that graphics images are produced on the display. By allowing nonlinear parameters within graphics primitives to be accurately and efficiently approximated using the dual-lookup table apparatus illustrated, the resulting display can include effects that would normally require much more complex, expensive processing engines.

Figure 7:
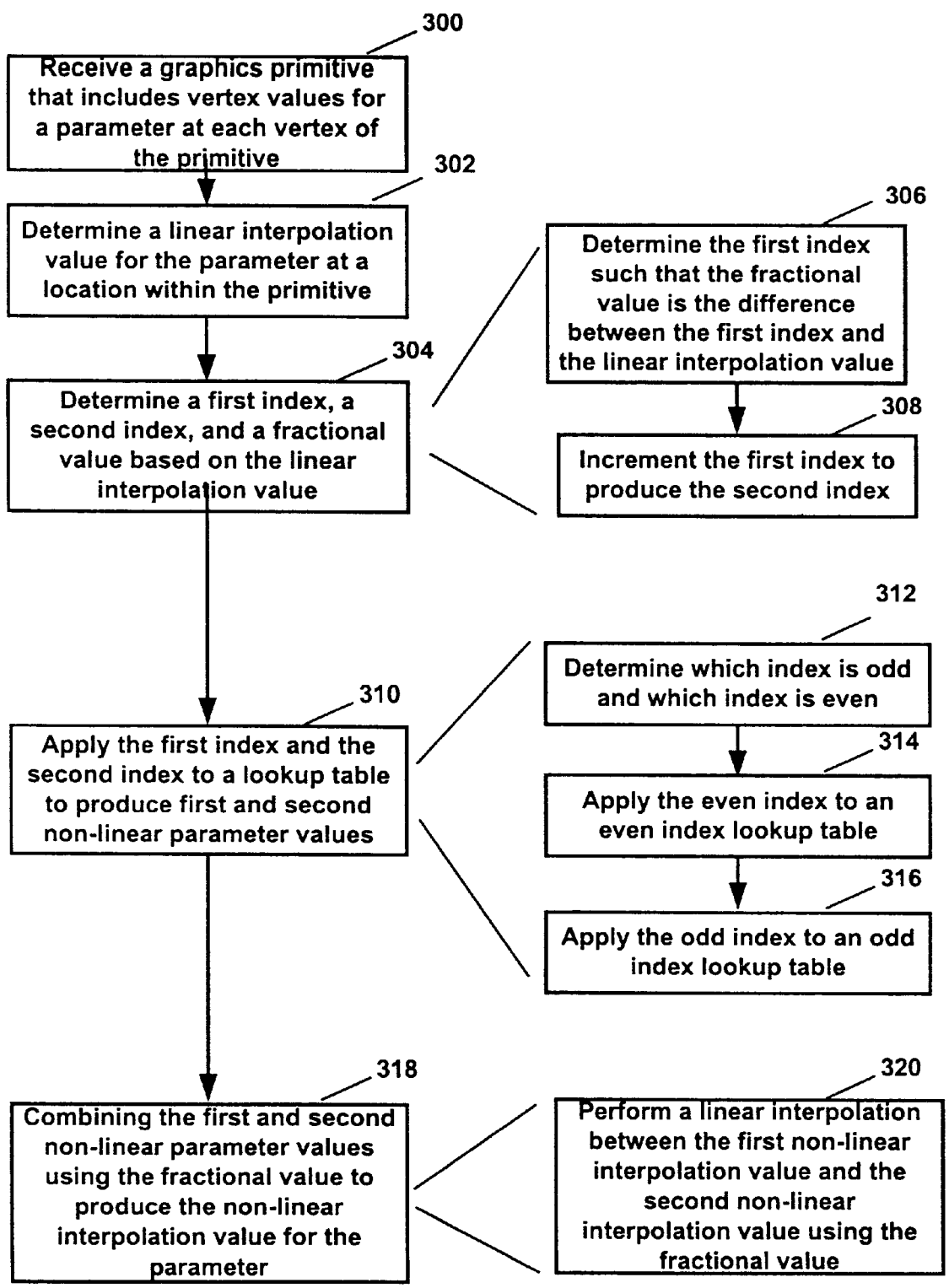
FIG. 7 illustrates a flow chart of a method for determining a nonlinear interpolation value for a parameter within a graphics primitive in accordance with the present invention.

FIG. 7 illustrates a flow chart of a method for determining a nonlinear interpolation value for a parameter at a location within a graphics primitive. The method begins with the receipt of a linear interpolation value for the parameter at the location within the graphics primitive. Preferably, this is accomplished at steps 300 and 302. At step 300, the graphics primitive is received, where the primitive is described with vertex values for the parameter at each vertex of the primitive. At step 302, the linear interpolation value is determined for the parameter at a particular location within the primitive. In some instances, the linear interpolation value is an effective first-level approximation of the nonlinear interpolation value of the parameter, which is further refined through the use of a lookup table.

At step 304, a first index, a second index, and a fractional value are determined based on the linear interpolation value. Preferably this is accomplished via steps 306 and 308. At step 306, the first index is determined such that the fractional value is the difference between the linear interpolation value and the first index. In such a case, the first index is the closest index that is less than the linear interpolation value. At step 308, the first index is incremented to produce the second index. As was described earlier, the first index and the second index correspond to the closest approximations to the linear interpolation value as can be achieved based on the sampling of the nonlinear function. Processing complexity makes it impractical to calculate values for the nonlinear function as needed, and therefore the nonlinear function is sampled at a plurality of discrete points, and the values of the nonlinear function for each of these discrete points is stored in a lookup table that is referenced by a plurality of indexes. Step 304 determines the two indexes that most closely approximate the linear interpolation value determined at step 302. The fractional value represents the error or difference between the actual linear interpolation value and the approximations of the first and second indexes.

At step 310, the first index and the second index are applied to the lookup table to produce first and second nonlinear parameter values. Because the lookup table stores a discrete sampling of the nonlinear parameter function, the first and second indexes will return points on the nonlinear curve that are proximal to the point on the nonlinear curve that corresponds to the linear interpolation value generated at step 302.

Step 310 may be accomplished through the execution of steps 312, 314, and 316. At step 312, it is determined which of the first and second indexes is the odd index and which index is the even index. As before, because the first and second indexes are sequential, one will odd and one will even. At step 314, the even index is applied to an even index lookup table, and at step 316, the odd index is applied to an odd index lookup table. These even and odd index lookup tables return the first and second nonlinear parameter values. Because it is understood that an even an odd index will always be present, the lookup table can be split into two separate lookup tables thus increasing the efficiency of the system by allowing the even and odd lookups to occur in parallel using memory blocks that are half the size of a memory block that stores all of the sample points.

At step 318, the first and second nonlinear parameter values determined at step 310 are combined using the fractional value to produce the nonlinear interpolation value for the parameter. The combination performed at step 318 may include performing a linear interpolation at step 320. At step 320, a linear interpolation is performed between the first nonlinear interpolation value and the second nonlinear interpolation value using the fractional value. As before, this is preferably done by computing a weighted average of the first and second nonlinear interpolation values based on the fractional value. If the linear interpolation value determined at step 302 is closer to the first index, the nonlinear interpolation value resulting from application of the first index to the lookup table will be weighted more heavily than the nonlinear interpolation value resulting from application of the second index to the lookup table, and vice-versa.

By discretely sampling a nonlinear function and storing samples of the nonlinear function in a lookup table, the lookup table can be indexed by linear approximations that are generated for a graphics primitive to effectively approximate nonlinear parameter variation throughout the primitive. The actual circuitry that performs this function can be optimized by understanding that the nonlinear approximation can be achieved in an accurate way by applying a first and second index to the nonlinear lookup table, where the first and second indexes are sequential. The sequential indexes ensure that one index is even and the other index is odd, thus allowing the lookup table to be split into two portions. By splitting the lookup table into two portions, lookups of the even and odd indexes can be performed simultaneously, rather than forcing two sequential lookups to occur in a single memory. This improves the throughput of the circuitry that performs the lookups and calculations of the nonlinear parameters within the system, without increasing the amount of memory required to store the discrete sampling of the nonlinear function.

The method and apparatus described herein can be effectively used to perform nonlinear approximations of a number of different parameters that are present in graphic systems, including a fogging parameter, an alpha blending parameter, a Z value parameter, a color parameter and a specular parameter. Allowing nonlinear approximations of these different parameters to be generated in a graphic system improves the ability of the graphic system to create special effects that mimic effects perceived in the "real" world. These effects are achieved in a manner that is both fast and efficient in its memory requirements, thus reducing system costs while quickly producing needed results.

It should be understood that the implementation of variations and modifications of the invention and its various aspects will be apparent to those of ordinary skill in the art, and that the invention is not limited to the specific embodiments described. For example, a plurality of index generation blocks may utilize the same memory structures to look up nonlinear parameter values. This could allow for even more parallelism in a system, thus increasing overall throughput. It is therefore contemplated to cover by the present invention, any and all modifications, variations, or equivalence that fall within the spirit and scope of the basic underlying principles disclosed and claimed herein.

What is claimed is:

1. A graphics processing circuit comprising:

a linear interpolator adapted to receive a graphics primitive, wherein the graphics primitive includes vertex values for a parameter at each vertex of the graphics primitive, wherein the linear interpolator determines a linear interpolation value for the parameter at a point within the primitive based on the vertex values;

a lookup table operably coupled to the linear interpolator, wherein the lookup table stores a nonlinear parameter function, wherein the lookup table provides a nonlinear parameter value in response to the linear interpolation value; and a display engine operably coupled to the lookup table, wherein the display engine combines the nonlinear parameter value with additional pixel data to produce a display signal.

2. The graphics processing circuit of claim 1 further comprises a setup engine operably coupled to the linear interpolator, wherein the setup engine generates graphics primitives for display.

3. The graphics processing circuit of claim 1, wherein the display engine further comprises:

a pixel processing pipe operably coupled to the lookup table, wherein the pixel processing pipe combines the nonlinear parameter value with at least a portion of the additional pixel data to produce a pixel color value, wherein the portion of the additional pixel data and the point of the primitive correspond to a selected pixel;

a memory operably coupled to the pixel processing pipe, wherein the memory stores the pixel color value; and a display interface operably coupled to the memory, wherein the display interface retrieves the pixel color value from the memory and includes it in the display signal.

4. The graphics processing circuit of claim 3 further comprises at least one additional nonlinear lookup table operably coupled to the pixel processing pipe, wherein the at least one additional nonlinear lookup table provides at least a portion of the additional pixel data.

5. The graphics processing circuit of claim 1, wherein the lookup table further comprises:
- an index generation block, wherein the index generation block determines a first index, a second index, and a fractional value based on the linear interpolation value, wherein the fractional value is based on a difference between the linear interpolation value and at least one of the first index and the second index;
- a memory block operably coupled to the index generation block, wherein the memory block provides a first nonlinear lookup value in response to the first index, and a second nonlinear lookup value in response to the second index; and
- an arithmetic unit operably coupled to the memory block and the index generation block, wherein the arithmetic unit generates the nonlinear parameter value based on the first nonlinear lookup value, the second nonlinear lookup value, and the fractional value.

6. The graphics processing circuit of claim 5, wherein the arithmetic unit performs a linear interpolation between the first nonlinear lookup value and the second nonlinear lookup value using the fractional value.

7. The graphics processing circuit of claim 6, wherein the memory block further comprises:
- an even memory block, wherein the even memory block stores nonlinear lookup values corresponding to even index values;
- an odd memory block, wherein the odd memory block stores nonlinear lookup values corresponding to odd index values; and
- an index routing block operably coupled to the index generation block, wherein one of the first index and the second index is an even index, wherein one of the first index and the second index is an odd index, wherein the index routing block routes the even index to the even memory block and the odd index to the odd memory block.

8. The graphics processing circuit of claim 1, wherein the lookup table stores an exponential parameter curve as the nonlinear parameter function.

9. The graphics processing circuit of claim 1, wherein the lookup table stores a nonlinear parameter function that corresponds to a fogging parameter, wherein the fogging parameter adds fogging effects to the display signal.

10. The graphics processing circuit of claim 1, wherein the lookup tables stores a nonlinear parameter function that corresponds to one of a plurality of effects parameters that includes an alpha blending parameter, a Z value parameter, a color parameter, and a specular parameter.

11. The graphics processing circuit of claim 1, wherein the lookup table stores a nonlinear parameter function that corresponds to a secondary parameter, wherein the nonlinear parameter value provided by the lookup table in response to the linear interpolation value corresponds to the secondary parameter.

12. The graphics processing circuit of claim 11, wherein the lookup table stores a nonlinear parameter function that corresponds to a fogging parameter, and wherein the linear interpolator determines a Z value linear interpolation value as the linear interpolation value, wherein the lookup table returns a nonlinear fogging parameter value as the nonlinear parameter value in response to Z parameter linear interpolation value.

13. A graphics processing circuit for determining at least one parameter value within a graphics primitive comprising:
- a linear interpolator adapted to receive the graphics primitive, wherein the graphics primitive includes vertex values for a parameter at each vertex of the graphics primitive, wherein the linear interpolator determines a first linear interpolation value for the parameter at a first selected pixel within the primitive based on the vertex values;
- a lookup table operably coupled to the linear interpolator, wherein the lookup table includes:
  - a first index generation block, wherein the first index generation block determines a first index, a second index, and a first fractional value based on the first linear interpolation value, wherein the first fractional value is based on a difference between the first linear interpolation value and at least one of the first index and the second index;
  - a memory block operably coupled to the index generation block, wherein the memory block stores a discrete sampling of a nonlinear function corresponding to the parameter, wherein the first index and the second index correspond to sample points of the nonlinear function, wherein the memory block provides a first sample of the nonlinear function in response to the first index and a second sample of the nonlinear function in response to the second index; and
  - a first arithmetic unit operably coupled to the memory block and the first index generation block, wherein the first arithmetic unit generates a first value for the parameter at the first selected pixel based on the first sample, the second sample, and the first fractional value.

14. The graphics processing circuit of claim 13, wherein the first arithmetic unit generates the first value for the parameter at the first selected pixel by performing a linear interpolation between the first sample and the second sample value using the first fractional value.

15. The graphics processing circuit of claim 14, wherein the memory block further comprises:
- an even memory block, wherein the even memory block stores samples of the nonlinear function corresponding to even index values;
- an odd memory block, wherein the odd memory block stores samples of the nonlinear function corresponding to odd index values; and
- a first index routing block operably coupled to the first index generation block, wherein one of the first index and the second index is a first even index, wherein one of the first index and the second index is a first odd index, wherein the first index routing block routes the first even index to the even memory block and the first odd index to the odd memory block, wherein the odd memory block provides one of the first and second samples in response to the first odd index, and wherein the even memory block provides one of the first and second samples in response to the first even index.

16. The graphics processing circuit of claim 15, wherein the first index generation block determines the first index, wherein the first fractional value is equal to the difference between the first index and the first linear interpolation value, and wherein the second index is determined by incrementing the first index.

17. The graphics processing circuit of claim 15,
wherein the linear interpolator determines a second linear interpolation value for the parameter at a second pixel location within the primitive based on the vertex values, and wherein the lookup table further comprises:
　a second index generation block, wherein the second index generation block determines a third index, a fourth index, and a second fractional value based on the second linear interpolation value, wherein the second fractional value is based on a difference between the second linear interpolation value and at least one of the third index and the fourth index;
　a second index routing block operably coupled to the second index generation block, wherein one of the third index and the fourth index is a second even index, wherein one of the third index and the fourth index is a second odd index, wherein the second index routing block routes the second even index to the even memory block and the second odd index to the odd memory block, wherein the odd memory block provides one of a third sample and a fourth sample in response to the second odd index, and wherein the even memory block provides one of the third and fourth samples in response to the second even index; and
a second arithmetic unit operably coupled to the even and odd memory blocks and the second index generation block, wherein the second arithmetic unit generates a second value for the parameter at the second selected pixel based on the third sample, the fourth sample, and the second fractional value.

18. A method for determining a nonlinear interpolation value for a parameter at a location within a graphics primitive, comprising:
　receiving a linear interpolation value for the parameter at the location within the graphics primitive;
　determining a first index, a second index, and a fractional value based on the linear interpolation value, wherein the fractional value determines the difference between the linear interpolation value and the first index and the second index;
　applying the first index and the second index to a lookup table to produce a first nonlinear parameter value and a second nonlinear parameter value, wherein the lookup table stores a nonlinear parameter function;
　combining the first nonlinear parameter value, the second nonlinear parameter value and the fraction to produce the nonlinear interpolation value for the parameter at the location.

19. The method of claim 18, wherein receiving further comprises:
　receiving a graphics primitive, wherein the graphics primitive includes vertex values for the parameter at each vertex of the graphics primitive; and
　determining the linear interpolation value for the parameter at the location based on the vertex values.

20. The method of claim 18, wherein determining the first index and the second index further comprises:
　determining the first index, wherein the fractional value is equal to the difference between the linear interpolation value and the first index; and
　incrementing the first index to produce the second index.

21. The method of claim 18, wherein applying the first index and the second index to the lookup table further comprises:
　applying an even index to an even index lookup table to determine the first nonlinear parameter value, wherein the even index is one of the first index and the second index, wherein the even index lookup table stores nonlinear parameter values corresponding to even index values; and
　applying an odd index to an odd index lookup table to determine the second nonlinear parameter value, wherein the odd index is one of the first index and the second index, wherein the odd index lookup table stores nonlinear parameter values corresponding to odd index values.

22. The method of claim 18, wherein combining further comprises performing a linear interpolation between the first nonlinear interpolation value and the second nonlinear interpolation value using the fractional value.

23. The method of claim 18, wherein the parameter is one of a fogging parameter, an alpha blending parameter, a Z value parameter, a color parameter, and a specular parameter.

\* \* \* \* \*